INVENTORS
William R. Carey, &
David C. King
ATTORNEYS

# United States Patent Office 3,527,475
Patented Sept. 8, 1970

3,527,475
VEHICLE SAFETY SYSTEM
William R. Carey, Farmington, and David Charles King, Plymouth, Mich., assignors to Eaton Yale & Towne, Inc., Cleveland, Ohio, a corporation of Ohio
Continuation of application Ser. No. 621,846, Mar. 9, 1967. This application Mar. 7, 1969, Ser. No. 806,049
Int. Cl. B60r 21/00
U.S. Cl. 280—150                                    2 Claims

ABSTRACT OF THE DISCLOSURE

A vehicle including a body with an inflating means supported by the body and in communication with a bag for inflating the bag with a fluid in response to a predetermined condition of the vehicle, such as a crash. The inflated bag prevents an occupant of the vehicle from impacting with the vehicle body and includes exhaust means comprising a patch secured over an aperture in the inflatable bag. The patch ruptures and exhausts fluid from the bag to automatically dissipate energy resulting from the movement of an occupant against the inflated bag during a crash, thus minimizing rebound of such an occupant.

---

This is a continuation of Ser. No. 621,846 filed Mar. 9, 1967, now abandoned.

Recently, there has been a large amount of talent and capital expended in the research and development of various safety devices for vehicles and particularly automobiles. Much of this effort has been expended in an attempt to solve the problems associated with the so-called second collision. The second collision occurs as a result of the crash of a vehicle when the occupant of the vehicle is thrown against and collides with portions of the vehicle, such as the instrument panel and/or windshield.

The prior art discloses various assemblies for solving this problem. One such prior art assembly includes an inflatable bag. The inflatable bag is normally stored in or supported by the vehicle body in a collapsed, folded position. Various sources of fluid pressure are utilized for inflating the bag. In one such prior art system, the occupant of the vehicle manually actuates the assembly in anticipation of an impending crash for inflating the bag. In other assemblies, the inflation of the bag is accomplished automatically in response to a predetermined operating condition of the vehicle as determined by appropriate sensing devices, such as accelerometers, inertia responsive switches, and the like. Such an assembly is disclosed in copending application Ser. No. 562,289, filed July 1, 1966 (now Pat. No. 3,414,292) in the names of Sidney Oldberg and William R. Carey and assigned to the assignee of the instant invention.

Although not all of the prior art assemblies have such a mode of operation, it is necessary that such an assembly have a mode of operation wherein the bag is substantially inflated in the period of time between the beginning of the crash of the vehicle and the time at which the occupant of the vehicles begins to move forward as a result of the crash, a period of time which is measured in milliseconds. Preferably, therefore, the bag is inflated and thereafter the occupant of the vehicle moves against and into the bag as the bag prevents the occupant from colliding with or impacting against the instrument panel and/or windshield of the vehicle.

One of the problems associated with such prior art assemblies is the so-called rebound of the occupant. In other words, the occupant moves into the bag as a result of the crash and the bag decelerates and finally stops the forward movement of the occupant; however, the bag and the pressurized fluid therein absorbs the energy resulting from the forward movement of the occupant and after the occupant's forward movement has been stopped, the bag throws the occupant in the opposite direction. This movement of the occupant in the opposite direction is rebound and is very dangerous. For example, as a result of such rebound, the occupant may suffer whiplash injuries and/or other serious injuries.

Accordingly, it is an object and feature of this invention to provide such an assembly including an inflatable bag having exhaust means associated with the bag for rupturing to exhaust fluid from the bag, thereby automatically dissipating the energy resulting from movement of an occupant against the inflated bag whereby rebound of such an occupant is eliminated or minimized.

Another object and feature of this invention is to pro-provide a safety assembly for use in combination with vehicle and including an inflatable bag with means supported by the vehicle and in communication with the bag for inflating the bag in response to a predetermined vehicle condition and including exhaust means associated with the bag for rupturing to exhaust fluid from the bag, thereby automatically dissipating the energy resulting from movement of an occupant against the inflated bag during such movement whereby rebound of such an occupant is minimized.

A further object and feature of this invention is to provide a safety assembly for use in combination with a vehicle and including an inflatable bag with means for inflating the bag wherein the bag includes exhaust means associated therewith for automatically beginning to exhaust fluid from the bag as the bag is being inflated and continuing to exhaust fluid from the bag for automatically dissipating the energy resulting from movement of an occupant against the inflated bag whereby rebound of such an occupant is minimized.

Yet another object and feature of this invention is to provide a safety assembly for use with an automobile including an inflatable bag having an aperture therein with a patch secured to the bag to cover the aperture so that the patch ruptures to exhaust fluid from the inflated bag to automatically dissipate the energy resulting from movement of an occupant against the inflated bag during movement of the occupant whereby rebound of such an occupant is minimized.

In general, these and other objects and features of this invention may be attained in a preferred embodiment of a safety system which is adapted to be attached to a vehicle for protecting an occupant thereof. The assembly includes an inflatable bag and an inflating means in communication with the bag for inflating the bag with fluid in response to a predetermined condition. As alluded to above, various means may be utilized for inflating the bag, such means normally including a pressure source and a sensing means for allowing fluid flow from the pressure source to the bag to inflate the bag in response to a predetermined operating condition of the vehicle. An example of such a pressure source and sensing means is disclosed in the above-mentioned copending application Ser. No. 562,289. There is also included an exhaust means associated with the bag for rupturing to exhaust fluid from the bag thereby automatically dissipating the energy resulting from movement of an occupant against the inflated bag during such movement of the occupant whereby rebound of an occupant is minimized. More specifically, the inflatable bag has an aperture therein and the exhaust means comprises a patch secured to the bag and covering the aperture. Preferably, the patch has a thickness which is less than the thickness of the bag so that upon inflation of the bag, the patch ruptures to exhaust fluid from the bag thereby to minimize the rebound of the occupant.

Other objects and attendant advantages of the present

3 invention will be readily appreciated as the same becomes better understood by reference to the following detailed description when considered in connection with the accompanying drawings wherein:

Figure 1:
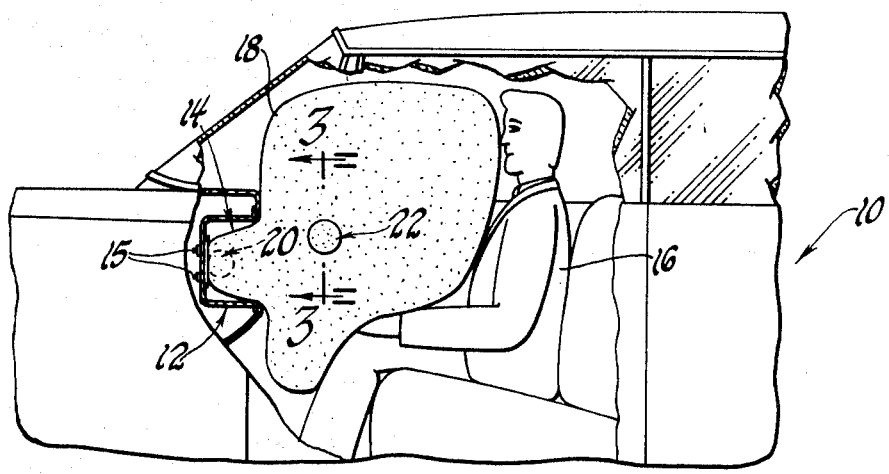
FIG. 1 is a partially broken away fragmentary view of a preferred embodiment of the instant invention with the bag thereof shown as inflated.

Referring now to the drawings, wherein like numerals indicate like or corresponding parts throughout the several views, a vehicle is generally shown at 10. The vehicle 10 includes a body generally indicated at 12, and a safety assembly generally indicated at 14 and adapted to be attached to the vehicle for protecting an occupant 16.

More specifically, the assembly 14 includes an inflatable bag 18 and inflating means, generally indicated at 20. The inflating means 20 is in communication with the bag 18 for inflating the bag with fluid in response to a predetermined condition. As alluded to above, various inflating means may be utilized; however, an example of one such means is disclosed in the aforementioned application Ser. No. 562,289. More specifically, that application discloses an elongated pressure container which is opened in response to the detonation of an explosive charge, the explosive charge being detonated by an inertia responsive means which supplies a signal to the explosive charge as a result of a predetermined operating condition of the vehicle, such as a crash. As illustrated in FIG. 1, the assembly is secured to the body 12 of the vehicle 10 by the bolts 15. During the normal operation of the vehicle, the bag 18 is folded into a compact mass disposed in the cavity formed by the body vehicle 12. In the event of a crash, accident, or the like, an appropriate sensing means allows fluid under pressure to inflate the bag 18.

There is also included an exhaust means generally indicated at 22 and associated with the bag 18 for rupturing to exhaust fluid from the bag 18, thereby automatically dissipating the energy resulting from movement of the occupant 16 against the inflated bag during such movement of the occupant whereby rebound of the occupant is minimized and/or prevented. The exhaust means 22 defines a portion of the bag 18 and has less strength than the bag 18. More specifically, the bag 18 has an aperture 24 therein and the exhaust means 22 comprises a patch secured to the bag 18 to cover the aperture 24. Preferably, the thickness of the patch is less than the thickness of the bag while both the bag 18 and the patch are made of the same material. However, it will be understood that the thickness of the patch may be the same as the thickness of the bag while the patch is made of a material different from the material of the bag in that it has less strength than the material of the bag.

Preferably, the patch is secured to the bag 18 by an adhesive 26, although it will be understood that the patch may be secured to the bag 18 by vulcanizing, or the like. Various materials may be utilized for the bag 18 and the patch; however, organic polymeric materials are preferably utilized. An example of a material which has been satisfactorily utilized is polyvinylchloride. Polyvinylchloride has been used to advantage for both the bag 18 and the patch.

Tests have indicated that a satisfactory assembly is provided when the thickness of the bag is between two and twenty times greater than the thickness of the patch. More specifically, assemblies utilizing a bag having a thickness of approximately twenty thousandths of an inch and a patch having a thickness between two and four thousandths of an inch have operated satisfactorily.

Figure 2:
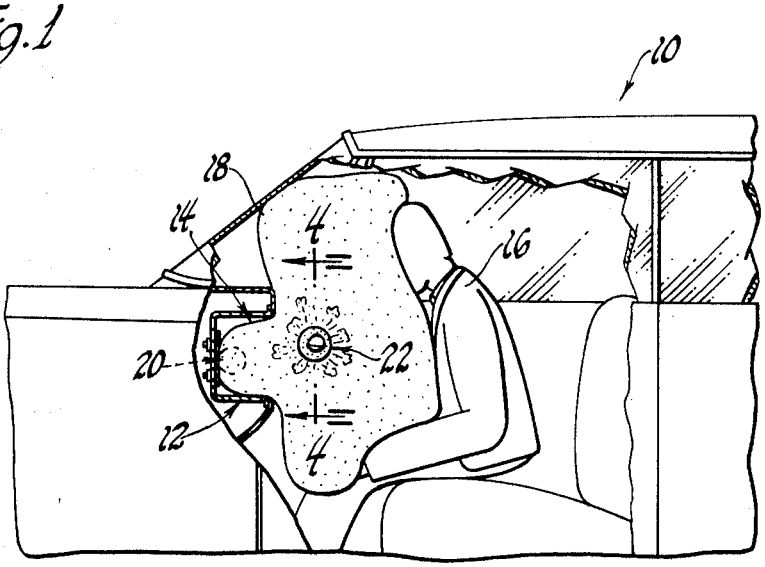
FIG. 2 is a partially broken away fragmentary view similar to FIG. 1 but showing the occupant of the vehicle moving against the inflated bag with the exhaust means exhausting fluid from the bag for dissipating the energy resulting from the movement of the occupant to minimize or prevent rebound.
Figure 3:
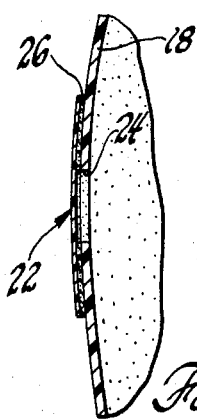
FIG. 3 is an enlarged fragmentary cross-sectional view taken substantially along line 3—3 of FIG. 1.
Figure 4:
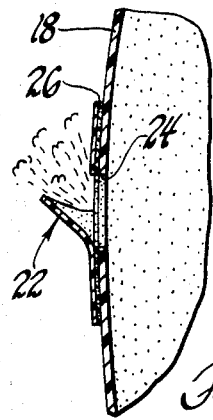
FIG. 4 is an enlarged fragmentary cross-sectional view taken substantially along line 4—4 of FIG. 2.

As illustrated in FIGS. 2 and 4, the patch ruptures substantially contiguously with the perimeter of the aperture 24 in the bag 18. Actually, the patch ruptures in a manner to form a flap. In other words, the patch ruptures substantially along the entire length of the periphery of the aperture 24 except for a portion which does not rupture and retains the patch adhesively secured to the bag 18.

Various variables, such as the pressure of the fluid in the pressure source and/or the thickness of the bag 18 will have a bearing upon whether or not the patch is adapted to rupture during the inflation of the bag 18 or only after the occupant 16 begins to move into the bag 18. The instant invention, however, is suited to accomplish both modes of operation because it may be adapted for rupturing and exhausting fluid only after the occupant begins to move into the bag, or may be adapted for automatically beginning to exhaust fluid from the bag as the bag is being inflated while continuing to exhaust fluid for automatically dissipating energy resulting from the movement of the occupant 16 against the inflated bag.

The instant invention, therefore, provides an assembly adapted to be attached to a vehicle for protecting an occupant of the vehicle during a crash. The assembly includes an inflatable bag and inflating means in communication with the bag to inflate the bag with fluid for disposing a predetermined amount of energy in the bag. The patch comprises means associated with the bag for automatically dissipating the predetermined amount of energy put into the bag plus that amount of energy resulting from movement of an occupant against the inflated bag so that insufficient energy remains to cause any substantial movement of the occupant in the opposite direction away from the bag; that is, to prevent rebound. In other words, energy is disposed in the bag when it is inflated with fluid, and, in addition, the inflated bag absorbs the energy resulting from the forward movement of the occupant against the bag. The patch, however, dissipates substantially all of this energy by venting the bag to atmosphere so that insufficient energy remains to cause the occupant to rebound in a manner which would be injurious.

The invention has been described in an illustrative manner and it is to be understood that the terminology which has been used is intended to be in the nature of words of description rather than of limitation.

Obviously, many modifications and variations of the present invention are possible in light of the above teachings.

Having described our invention, we claim:

1. Safety apparatus for a vehicle comprising an expandable confinement, a fluid source adapted to expand said confinement in response to a predetermined condition for enabling said confinement to be positioned to restrain movement of an occupant of the vehicle by absorbing the kinetic energy thereof, said confinement having an aperture, a patch having a portion covering said aperture with a remaining portion thereof being disposed in overlapping relationship to at least a part of the confinement which is adjacent the aperture, and means securing the remaining portion of the patch to the part of the confinement with the portion of the patch being weaker than the confinement, said portion of the patch and said aperture defining an area of preferred weakness with said remaining portion of the patch and the part of the confinement defining an area of preferred strength, said portion of the patch cooperating with said fluid source to expand said confinement by limiting fluid exhaust flow through said aperture during expansion of said confinement, said area of preferred weakness being rupturable by a predetermined pressure value in the confinement to define a fluid exhaust area and being effective to limit pressure increase therein and prevent bursting thereof, said area of preferred weakness on rupturing dissipating energy put into the confinement on expansion thereof plus kinetic energy of the occupant absorbed thereby so that there is insufficient energy in the confinement to cause any substantial rebound of the occupant therefrom, said area of preferred strength being effective to limit the fluid exhaust area and maintain the confinement expanded for a time period to allow the occupant to be restrained by said expanded confinement.

2. Safety apparatus for a vehicle comprising an expandable confinement, a fluid source adapted to expand said confinement in response to a predetermined condition for enabling said confinement to be positioned to restrain movement of an occupant of the vehicle by absorbing the kinetic energy thereof, said confinement having an aperture, a patch having a portion covering said aperture with a remaining portion thereof being disposed in overlapping relationship to at least a part of the confinement which is adjacent the aperture, and means securing the remaining portion of the patch to the part of the confinement with the portion of the patch being weaker than the confinement, said portion of the patch and said aperture defining an area of preferred weakness with said remaining portion of the patch and the part of the confinement defining an area of preferred strength, said portion of the patch cooperating with said fluid source to expand said confinement by limiting fluid exhaust flow through said aperture during expansion of said confinement, said area of preferred weakness being rupturable by a predetermined pressure value in the confinement to define a fluid exhaust area and being effective to limit pressure increase therein and prevent bursting thereof while dissipating the kinetic energy of the occupant absorbed by the expanded confinement by relieving the confinement of a volume of fluid substantially equal to that displaced by the occupant to prevent the expanded confinement from storing the kinetic energy of said occupant and rebounding said occupant, said area of preferred strength being effective to limit the fluid exhaust area and maintain the confinement expanded for a time period to allow the occupant to be restrained by said expanded confinement.

References Cited

UNITED STATES PATENTS 2,713,466  7/1955  Fletcher et al. _____ 244—138

FOREIGN PATENTS 953,312  3/1964  England.

KENNETH H. BETTS, Primary Examiner